(12) United States Patent  (10) Patent No.: US 8,297,834 B2
Xiao  (45) Date of Patent: Oct. 30, 2012

(54) TEMPERATURE INDICATION APPARATUS

(75) Inventor: Zong-Bao Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 345 days.

(21) Appl. No.: 12/770,787

(22) Filed: Apr. 30, 2010

(65) Prior Publication Data

US 2011/0188539 A1    Aug. 4, 2011

(30) Foreign Application Priority Data

Jan. 29, 2010   (CN) .......................... 2010 2 0301860

(51) Int. Cl.
*G01K 7/16* (2006.01)
*G01K 7/00* (2006.01)
(52) U.S. Cl. ................. 374/44; 374/183; 374/E7.001
(58) Field of Classification Search .............. 374/4, 5, 374/29, 30, 43, 44, 137, 163, 170, 183, E7.001, 374/E7.018
See application file for complete search history.

(56) References Cited

U.S. PATENT DOCUMENTS

| | | | | | |
|---|---|---|---|---|---|
| 3,915,003 | A | * | 10/1975 | Adams | 374/164 |
| 3,927,571 | A | * | 12/1975 | Athey | 374/111 |
| 4,068,138 | A | * | 1/1978 | Miyakawa et al. | 327/334 |
| 4,406,398 | A | * | 9/1983 | Perkins | 236/12.15 |
| 4,418,339 | A | * | 11/1983 | Spofford et al. | 340/595 |
| 4,420,446 | A | * | 12/1983 | Wieder et al. | 264/40.6 |
| 4,576,487 | A | * | 3/1986 | Conover et al. | 374/183 |
| 2010/0315019 | A1 | * | 12/2010 | Hoogzaad et al. | 315/291 |

FOREIGN PATENT DOCUMENTS

JP    59028632 A  *  2/1984

* cited by examiner

*Primary Examiner* — R. A. Smith
(74) *Attorney, Agent, or Firm* — Altis Law Group, Inc.

(57) ABSTRACT

An indication apparatus for indicating temperature status of a motherboard includes a detection module, a comparison module, a switch module, and an indication module. The detection module detects temperatures of the motherboard, and converts the detected temperatures to voltage signals. The comparison module receives the voltage signals, compares the voltage signals with a first reference voltage, and outputs control signals according to a comparison result. The switch module receives the control signals, and turns on or off according to the control signals. The indication module indicates temperature states of the motherboard when the switch module turns on or off.

12 Claims, 2 Drawing Sheets

TEMPERATURE INDICATION APPARATUS

BACKGROUND

1. Technical Field

The present disclosure relates to indication apparatuses, and particularly to an indication apparatus for indicating temperature status of motherboards.

2. Description of Related Art

Developments in today's highly information-intensive society have led to remarkable improvements in the performance of electronic devices. During operation of many contemporary electronic devices such as computers central processing units (CPUs), large amounts of heat are produced. Typically, a fan is used to facilitate removal of the heat.

However, the fan may not operate properly and overheating still occur so monitoring of temperatures is very important.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
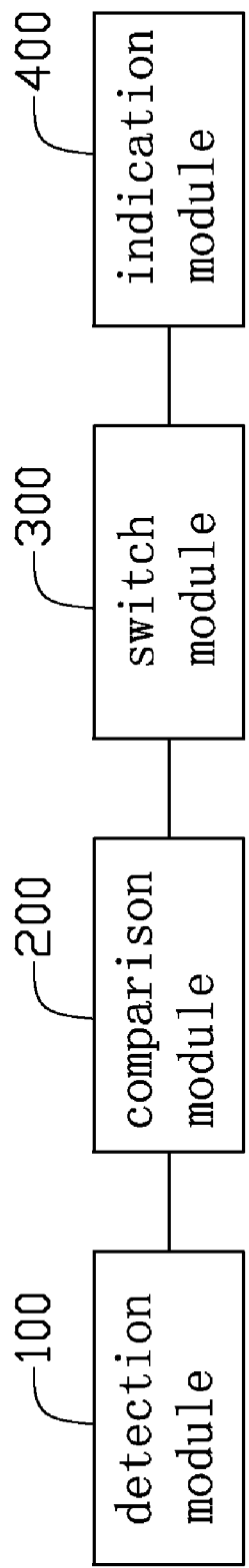
FIG. 1 is a block view of an embodiment of a temperature indication apparatus.

Referring to FIG. 1, an indication apparatus in an embodiment for indicating temperature status of a motherboard (not shown) includes a detection module 100, a comparison module 200, a switch module 300, and an indication module 400. The detection module 100 detects temperatures of the motherboard, and converts the detected temperatures to voltage signals. The comparison module 200 receives the voltage signals, compares the voltage signals with a reference voltage, and outputs control signals according to a comparison result. The switch module 300 receives the control signals, and turns on or off according to the control signals. The indication module 400 indicates temperature states of the motherboard when the switch module 300 turns on or off.

Figure 2:
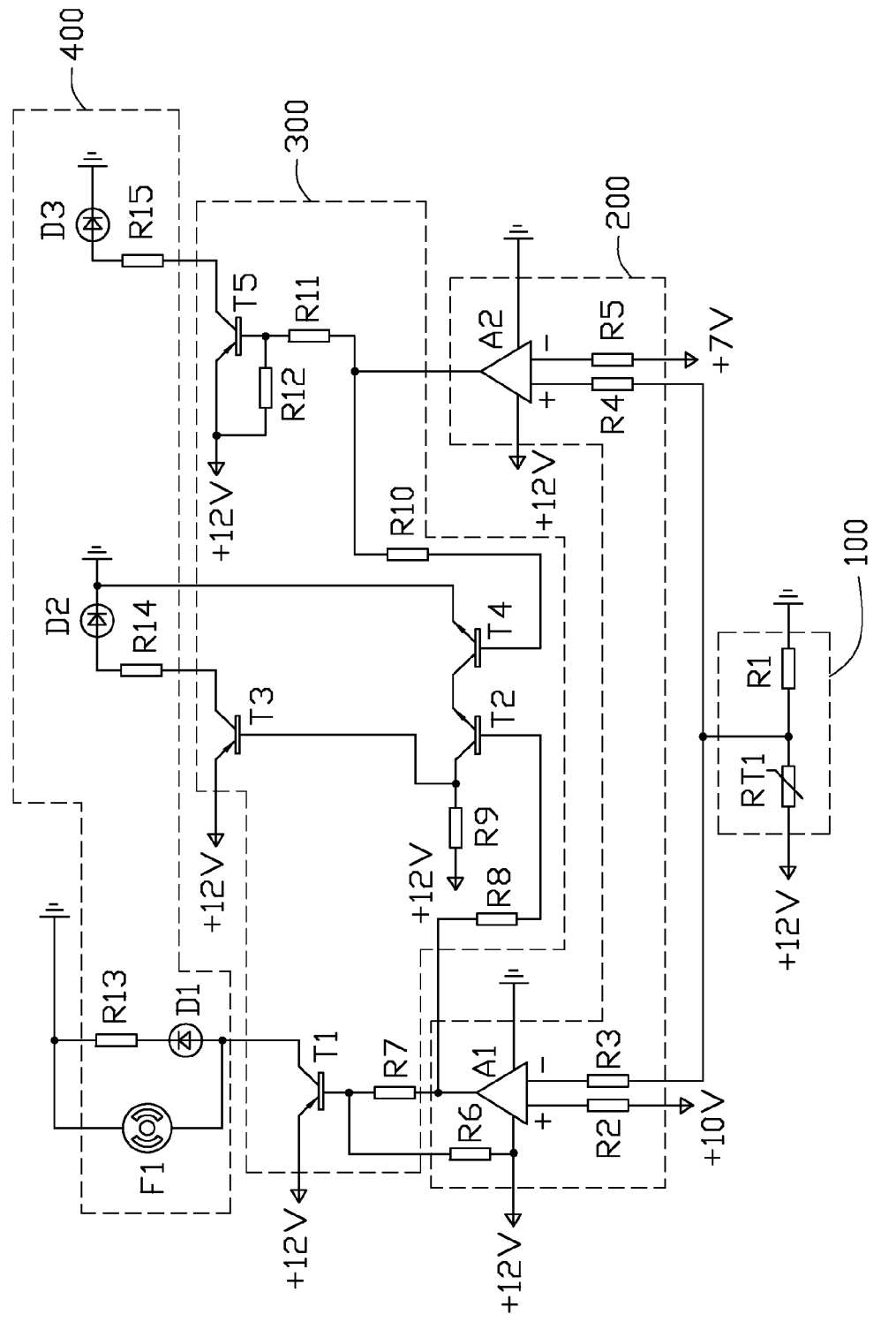
FIG. 2 is a schematic view of the temperature indication apparatus of FIG. 1.

Referring to FIG. 2, the detection module 100 includes a thermal resistor RT1 and a resistor R1. A first terminal of the thermal resistor RT1 receives +12 volt. A second terminal of the thermal resistor RT1 is grounded via the resistor R1. The comparison module 200 includes comparators A1, A2 and resistors R2~R6. A non-inverting input terminal of the comparator A1 receives a reference voltage via the resistor R2. An inverting input terminal of the comparator A1 is electrically coupled to a connection point between the thermal resistor RT1 and the resistor R1 via the resistor R3. A non-inverting input terminal of the comparator A2 is electrically coupled to the connection point between the thermal resistor RT1 and the resistor R1 via the resistor R4. An inverting input terminal of the comparator A2 receives a +7 volt reference voltage via the resistor R5. In one embodiment, a resistance of the thermal resistor RT1 is 33 kiloohms. A resistance of the resistor R1 is 3.3 kiloohms. The thermal resistor RT1 contacts a heat dissipating portion on the motherboard. A resistance of the thermal resistor RT1 is variable corresponding to temperature status of the motherboard. In one embodiment, the reference voltage is +10 volt.

The switch module 300 includes transistors T1~T5 and resistors R7~R11. A base of the transistor T1 is electrically coupled to an output terminal of the comparator A1 via the resistor R7. The base of the transistor T1 receives the +12 volt via the resistor R6. An emitter of the transistor T1 receives the +12 volt. A base of the transistor T2 is electrically coupled to the output terminal of the comparator A1 via the resistor R8. A collector of the transistor T2 receives the +12 volt via the resistor R9. The collector of the transistor T2 is electrically coupled to a base of the transistor T3. An emitter of the transistor T2 is electrically coupled to a collector of the transistor T4. An emitter of the transistor T3 receives the +12 volt. A base of the transistor T4 is electrically coupled to an output terminal of the comparator A2 via the resistor R10. An emitter of the transistor T4 is grounded. A base of the transistor T5 is electrically coupled to the output terminal of the comparator A2 via the resistor R11. The base of the transistor T5 receives the +12 volt via the resistor R12. An emitter of the transistor T5 receives the +12 volt. In one embodiment, the transistors T1, T3, and T5 are pnp type transistors. The transistors T2 and T4 are npn type transistors.

The indication module 400 includes LEDs D1~D3, a fan F1, and resistors R13~R15. An anode of the LED D1 is electrically coupled to a collector of the transistor T1. A cathode of the LED D1 is grounded via the resistor R13. The collector of the transistor T1 is grounded via the fan F1. An anode of the LED D2 is electrically coupled to a collector of the transistor T3 via the resistor R14. A cathode of the LED D2 is grounded. An anode of the LED D3 is electrically coupled to a collector of the transistor T5 via the resistor R15. A cathode of the LED D3 is grounded. In one embodiment, the LEDs D1~D3 emit red, orange, and blue light respectively.

In use, the temperature of the thermal resistor RT1 will fluctuate with the temperature of the heat dissipating portion, thus when the temperature of the heat dissipating portion is less than a normal temperature, resistance of the thermal resistor RT1 will be greater than 2.36 kiloohms, and voltage at the connection point between the thermal resistor RT1 and the resistor R1 will be less than $12 \div (2.36+3.3) \times 3.3 = 7$ volt. Then, the output terminal of the comparator A1 outputs a high voltage level, and the output terminal of the comparator A2 outputs a low voltage level. Thus the transistors T1, T4 turn off, the transistors T2, T5 turn on, and the transistor T3 turns off. The LEDs D1, D2 do not emit light, and the LED D3 emits blue light to indicate the motherboard is at a normal temperature.

When the temperature of the heat dissipating portion is greater than the normal temperature, but less than an upper limit temperature, resistance of the thermal resistor RT1 will be less than 2.36 kiloohms, but greater than 0.66 kiloohms A voltage of the connection point between the thermal resistor RT1 and the resistor R1 will be greater than 7 volt, but less than 12÷(0.66+3.3)×3.3=10 volt. The output terminals of the comparators A1, A2 output low voltage levels. Thus, the transistors T1, T5 turn off, and the transistors T2, T3, T4 turn on. The LEDs D1, D3 do not emit light, and the LED D2 emits orange light to indicate the motherboard is at a slightly high temperature.

When the thermal resistor RT1 detects a temperature of the heat dissipating portion is greater than the upper limit temperature, resistance of the thermal resistor RT1 will be less than 0.66 kiloohms and voltage of the connection point between the thermal resistor RT1 and the resistor R1 will be greater than 10 volt. The output terminal of the comparator A1 outputs a low voltage level, and the output terminal of the comparator A2 outputs a high voltage level. The transistors T1, T4 turn on, and the transistors T2, T3, T5 turn off. The LEDs D2, D3 do not emit light, and the LED D1 emits red light to indicate the motherboard is at a very high temperature. The fan F1 is powered on and rotates to dissipate heat for the heat dissipating portion.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An indication apparatus for indicating temperature status of a heat dissipating portion on a motherboard, comprising:
   a detection module capable of detecting temperatures of the heat dissipating portion, and converting the detected temperatures to voltage signals; the detection module comprises a thermal resistor and a first resistor; a first terminal of the thermal resistor is capable of receiving a first voltage; a second terminal of the thermal resistor is grounded via the first resistor;
   a comparison module capable of receiving the voltage signals, comparing the voltage signals with a first reference voltage, and outputting control signals according to a comparison result; the comparison module comprises a first comparator; a non-inverting input terminal of the first comparator is capable of receiving the first reference voltage; an inverting input terminal of the first comparator is electrically coupled to a connection point between the thermal resistor and the first resistor;
   a switch module capable of receiving the control signals, and turning on or off according to the control signals; the switch module comprises a first transistor, a second transistor, and a third transistor; each bases of the first transistor and the second transistor is electrically coupled to an output terminal of the first comparator; each of an emitter of the first transistor and a collector of the second transistor is capable of receiving the first voltage; an emitter of the second transistor is grounded; the collector of the second transistor is electrically coupled to a base of the third transistor; an emitter of the third transistor is capable of receiving the first voltage; and
   an indication module capable of indicating temperature states of the heat dissipating portion when the switch module turns on or off.

2. The apparatus of claim 1, wherein the indication module comprises a first LED, a second LED, and a fan; an anode of the first LED is electrically coupled to a collector of the first transistor; a cathode of the first LED is grounded; the collector of the first transistor is grounded via the fan; an anode of the second LED is electrically coupled to a collector of the third transistor; a cathode of the second LED is grounded.

3. The apparatus of claim 2, wherein the comparison module further comprises a second comparator; a non-inverting input terminal of the second comparator is electrically coupled to the connection point between the thermal resistor and the first resistor; an inverting input terminal of the second comparator is capable of receiving a second reference voltage.

4. The apparatus of claim 3, wherein the switch module further comprises a fourth transistor and a fifth transistor; bases of the fourth and a fifth transistors are electrically coupled to an output terminal of the second comparator respectively; a collector of the fourth transistor is electrically coupled to the emitter of the second transistor; an emitter of the fourth transistor is grounded; an emitter of the fifth transistor is capable of receiving the first voltage.

5. The apparatus of claim 4, wherein the indication module further comprises a third LED; an anode of the third LED is electrically coupled to a collector of the fifth transistor; a cathode of the third LED is grounded.

6. The apparatus of claim 5, wherein the first, third, and fifth transistors are PNP type transistors; the second and fourth transistors are NPN type transistors.

7. An indication apparatus for indicating temperature status of a heat dissipating portion on a motherboard, comprising:
   a detection module capable of detecting temperatures of the heat dissipating portion, and converting the detected temperatures to voltage signals; the detection module comprises a thermal resistor and a first resistor; a first terminal of the thermal resistor is capable of receiving a first voltage; a second terminal of the thermal resistor is grounded via the first resistor;
   a comparison module capable of receiving the voltage signals, comparing the voltage signals with a first reference voltage, and outputting control signals according to a comparison result; the comparison module comprises a first comparator and a second comparator; a non-inverting input terminal of the first comparator is capable of receiving the first reference voltage; an inverting input terminal of the first comparator is electrically coupled to a connection point between the thermal resistor and the first resistor; a non-inverting input terminal of the second comparator is electrically coupled to the connection point between the thermal resistor and the first resistor; an inverting input terminal of the second comparator is capable of receiving a second reference voltage;
   a switch module capable of receiving the control signals, and turning on or off according to the control signals; and
   an indication module capable of indicating temperature states of the heat dissipating portion when the switch module turns on or off.

8. The apparatus of claim 7, wherein the switch module comprises a first transistor, a second transistor, and a third transistor; each bases of the first transistor and the second transistor is electrically coupled to an output terminal of the first comparator; each of an emitter of the first transistor and a collector of the second transistor is capable of receiving the first voltage; an emitter of the second transistor is grounded; the collector of the second transistor is electrically coupled to a base of the third transistor; an emitter of the third transistor is capable of receiving the first voltage.

9. The apparatus of claim 8, wherein the indication module comprises a first LED, a second LED, and a fan; an anode of the first LED is electrically coupled to a collector of the first transistor; a cathode of the first LED is grounded; the collector of the first transistor is grounded via the fan; an anode of the second LED is electrically coupled to a collector of the third transistor; a cathode of the second LED is grounded.

10. The apparatus of claim 8, wherein the switch module further comprises a fourth transistor and a fifth transistor; each bases of the fourth and the fifth transistors is electrically coupled to an output terminal of the second comparator; a collector of the fourth transistor is electrically coupled to the emitter of the second transistor; an emitter of the fourth transistor is grounded; an emitter of the fifth transistor is capable of receiving the first voltage.

11. The apparatus of claim 10, wherein the indication module comprises a third LED; an anode of the third LED is electrically coupled to a collector of the fifth transistor; a cathode of the third LED is grounded.

12. The apparatus of claim 10, wherein the first, the third, and the fifth transistors are PNP type transistors; the second and the fourth transistors are NPN type transistors.

\* \* \* \* \*